United States Patent [19]

van Tetering et al.

[11] Patent Number: 5,343,463
[45] Date of Patent: Aug. 30, 1994

[54] PERFORMANCE MEASUREMENT SYSTEM FOR A TELECOMMUNICATION PATH AND DEVICE USED THEREIN

[75] Inventors: Johannes A. M. van Tetering, Zevenbergen, Netherlands; Frank L. Denissen, Boom, Belgium

[73] Assignee: Alcatel N.V., Amsterdam, Netherlands

[21] Appl. No.: 931,874

[22] Filed: Aug. 18, 1992

[30] Foreign Application Priority Data

Aug. 19, 1991 [EP] European Pat. Off. ......... 91202107.8

[51] Int. Cl.⁵ .......................... H04J 3/14; H04L 12/56
[52] U.S. Cl. ...................................... 370/13; 370/94.1
[58] Field of Search ................. 370/13, 13.1, 14, 17; 371/20.1, 20.2, 20.4; 379/22

[56] References Cited

U.S. PATENT DOCUMENTS

| | | | |
|---|---|---|---|
| 4,273,955 | 6/1981 | Armstrong | 370/13 |
| 4,996,695 | 2/1991 | Dack et al. | 370/13 |

FOREIGN PATENT DOCUMENTS

| | | |
|---|---|---|
| 0231967 | 8/1987 | European Pat. Off. . |
| 0427066 | 5/1991 | European Pat. Off. . |
| 4105443 | 4/1992 | Japan ................... 370/13 |

OTHER PUBLICATIONS

"A Technique for Fault-Detection and Performance Measurement in Data Communications Networks"; W. Boghdady et al., *IEEE International Conference on Communications,* Amsterdam, May 1984, vol. 3, pp. 1366–1370.

*Primary Examiner*—Douglas W. Olms
*Assistant Examiner*—Hassan Kizou
*Attorney, Agent, or Firm*—Ware, Fressola, Van Der Sluys & Adolphson

[57] ABSTRACT

A device (PMD) and a method for measuring the performances characteristics of a communication path of a telecommunication packet switching network (ATM) by transmitting test packets through this path while other live traffic is operating. The test packets are live data communication packets of the live traffic and of which the communication data has been replaced by performance measurement data. No traffic of test packets is thereby added to the existing live traffic and the latter is not disturbed by the measurements.

16 Claims, 2 Drawing Sheets

PERFORMANCE MEASUREMENT SYSTEM FOR A TELECOMMUNICATION PATH AND DEVICE USED THEREIN

TECHNICAL FIELD

The present invention relates to a performance measurement device for at least one communication path between a first and a second subscriber location of a telecommunication packet switching network, said device including test packet generation means for generating test packets and for transmitting them through said switching network via said communication path, and packet analyzer means for receiving said test packets from said switching network and for measuring the performance characteristics of said communication path.

BACKGROUND OF THE INVENTION

For the evaluation of the performance characteristics of a communication path, e.g. the bit error rate, the number of packets lost and/or inserted, the delay jitter, etc. . . . , a "measurement traffic" of test packets has to be generated. This measurement traffic is either constituted by test packets added to the existing live traffic of data communication packets or by test packets simulating such live traffic.

In case of addition of test packets, the ratio of these test packets on the live packets must remain very low, e.g. less than one percent, to avoid too much disturbance on the performance characteristics of the live transmission. As a result, a long measurement time is required for establishing the packet loss since the latter is generally of about $10^{-8}$ for a switching network and is calculated by means of the test packets only.

In case of simulation, real time traffic generators or sources are simulated by mathematical models, e.g. by Gaussian or exponential distributions, and to obtain reliable results the simulated test packet stream must resemble as much as possible the live traffic. This resemblance is however not obvious to obtain in practice.

DISCLOSURE OF INVENTION

An object of the present invention is to provide a performance measurement device whereof the test packets do not disturb the other existing real time traffic of the switching network and wherein the generated measurement traffic corresponds exactly to live traffic.

According to the invention, this object is achieved due to the fact that said test packet generation means are adapted to receive live data communication packets from a live traffic source located at said first subscriber location and to transform said live packets into said test packets.

In this way, no test packets are added to the existing real time traffic and the latter is thereby not disturbed. Moreover, because the data communication packets of the live traffic source, e.g. a video source, are used to create the measurement traffic of test packets, this test traffic corresponds exactly to live traffic between the first and second subscriber locations.

It is to be noted that when replacing live packets by test packets, the corresponding live traffic no longer exists. A possible solution to keep the live traffic active is to make a copy of the live packets prior to translating them into test packets and to transmit these copies to the second subscriber location via another communication path through the switching network.

Another characteristic feature of the present invention is that said test packet generation means, said packet analyzer means and said live traffic source are all connected to said switching network, and that said live packets are received in said test packet generation means from said live traffic source via said switching network.

The performance measurement device needs thus not to be located exactly at the same location as the live traffic source.

Still another characteristic feature of the present invention is that the performance measurement device further includes packet switching means coupled between said live traffic source and said test packet generation means, said packet switching means being adapted to receive packets and to transmit them either to said test packet generation means or to said switching network according to predetermined parameters stored in said packets.

In this way, all the live packets of a particular type, e.g. video packets, may for instance be transmitted from different live traffic sources to the performance measurement device and more particularly to the packet switching means thereof. On the one hand, the live packets which have to be transformed into test packets are sent by the packet switching means to the test packet generation means whilst, on the other hand, the remaining live packets are sent back to the switching network without modification.

Also another characteristic feature of the present invention is that each of said packets has a data field and a header which stores routing information indicative of the destination of said packet through said switching network and that said predetermined parameters are stored in said header of said packet.

The invention is also characterized by the fact that said packet analyzer means are coupled between said live traffic source and said test packet generation means and are adapted to receive packets, to recognize test packets from live packets and to transmit the latter to said test packet generation means.

Further, said test packet generation means provide one test packet for each of said live packets received from said packet analyzer means and the data field of said test packet stores performance measurement data.

Without modifying the data field of the data communication packets, the only performance characteristic which can be measured is the packet inter-arrival time because the data communication packets contain no performance measurement data which can be used for determining the other performance characteristics mentioned above.

Furthermore, the header of said test packet provided by said test packet generation means is at least partly identical to the header of the corresponding live packet received from said packet analyzer means.

It is also a feature of the invention that said packet analyzer means are coupled between said packet switching means and said test packet generation means, said packet analyzer means being adapted to receive test packets and to perform the performance measurement as a function of performance measurement data stored in the data field of said received test packets.

The performance measurement device is thereby not only able to generate test packets from received data communication packets, but it can also receive test packets and analyze them to obtain the requested performance measurements.

In a preferred embodiment, said switching network is an Asynchronous Transfert Mode (ATM) switching network.

The present invention also relates to a method for measuring the performance characteristics of at least one communication path of a telecommunication packet switching network by transmitting test packets through said network. This method is characterized in that said test packets are live data communication packets of live traffic and of which the communication data is replaced by performance measurement data.

The above mentioned and other objects and features of the invention will become more apparent and the invention itself will be best understood by referring to the following description of an embodiment taken in conjunction with the accompanying drawing.

Figure 1:
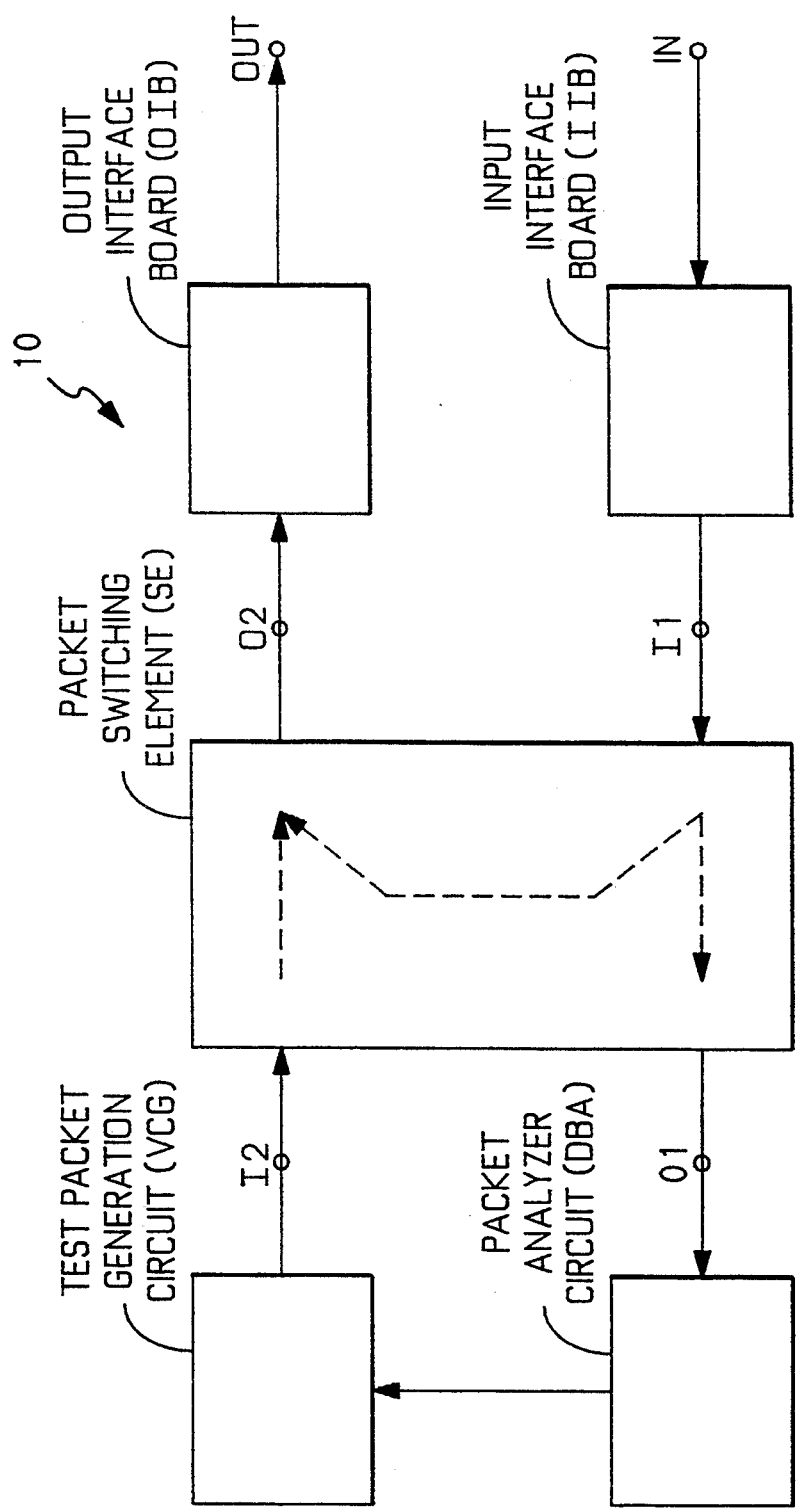
FIG. 1 shows a performance measurement device (PMD), according to the invention.
Figure 2:
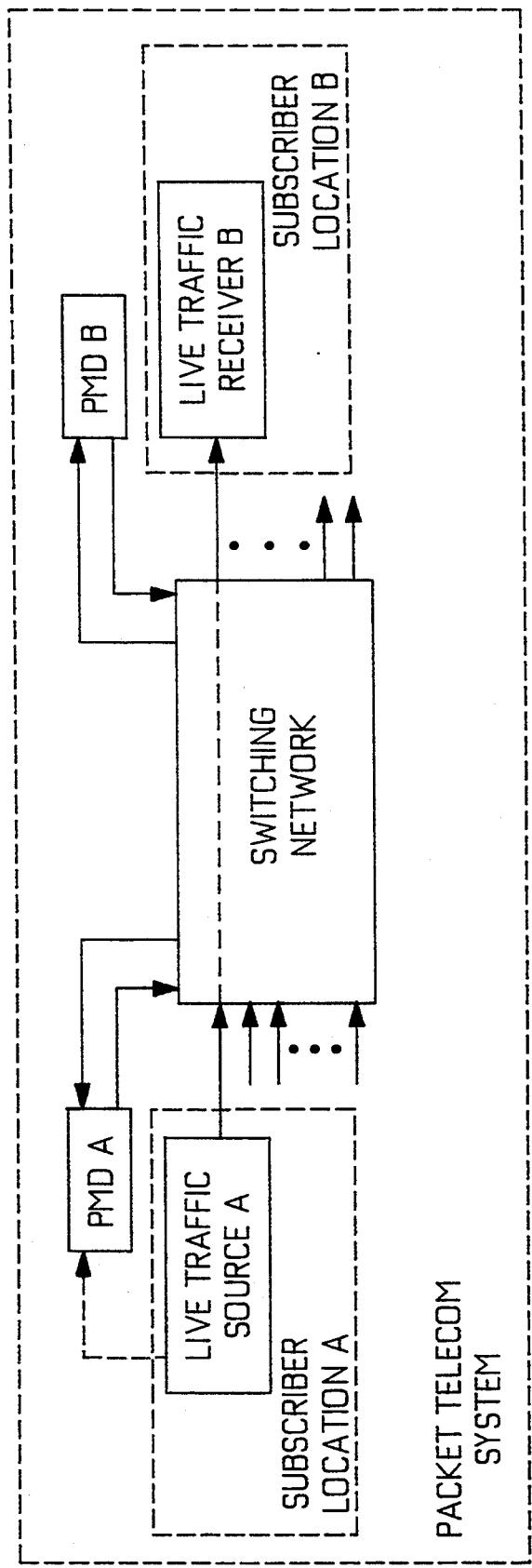
FIG. 2 shows a performance measurement system, according to the invention, in which the PMD device of FIG. 1 may be used.

Referring to the Figures, performance measurement device PMD of FIG. 1 forms part of a packet telecommunication system of FIG. 2 which also includes an Asynchronous Transfer Mode (ATM) switching network and live traffic sources and receivers connected thereto. The live traffic sources are located at subscriber locations and generate live data communication packets containing user data such as digital video signals. In normal operation, these live packets are transmitted through the switching network via one or more communication paths from the live traffic source at a first subscriber location to the live traffic receiver at a second subscriber location.

It is to be noted that although in the Asynchronous Transfer Mode (ATM) technique the word "cell" is preferred to the word "packet", only the latter will be used in the following part of this description.

Each packet has a header and a data field also called payload. The header contains routing information indicative of the destination, i.e. the address of the second subscriber location and parameters allowing at least to identify the type of packet, e.g. a video packet or a maintenance packet. In the Asynchronous Transfer Mode switching technique, the routing information is constituted by a so-called Virtual Channel Identifier/Virtual Path Identifier (VCI/VPI). The data field contains communication data or user information which, in the case of a video packet, is constituted by digital video signals.

In order to perform measurements on the performance characteristics of a communication path and thus of the telecommunication system and more particularly of the ATM switching network thereof, test packets are generated and are merged with live packets of other communications, e.g. communications between other subscriber locations. These test packets are in fact former live packets of a communication initially intended between the first and the second subscriber locations and of which the user information contained in the data field has been replaced by performance measurement data. Such test packets are generated—and analyzed as will be explained later—by the performance measurement device PMD which will be described below.

The performance measurement device PMD shown in the Figure has an input terminal IN and an output terminal OUT both connected to the ATM switching network. The input terminal IN is connected to a first input I1 of a switching element SE via an input interface board IIB. The switching element SE has a second input I2 and two outputs O1 and O2. The output O1 of SE is coupled to its second input I2 via a distribution based analyzer or packet analyzer circuit DBA and a virtual channel generator or test packet generation circuit VCG in series. Finally, the second output O2 of the switching element SE is connected to the output terminal OUT of PMD via an output interface board OIB.

The interface boards IIB and OIB carry well known standard interface devices and are therefore not described in more detail hereafter.

When for instance the traffic performance has to be measured for live packets, e.g. video packets, transmitted from the first subscriber location, say A (not shown), to the second subscriber location, say B (also not shown), a first performance measurement device PMD, hereafter referred to as PMDA, is installed near to A whilst a second performance measurement device PMD, hereafter referred to as PMDB, is installed near to B. Since both PMDA and PMDB are identical to the above performance measurement device PMD shown, they are not represented individually.

The switching elements SE of PMDA and PMDB are first initialized to recognize video packets transmitted from the subscriber location A to the subscriber location B. Switching elements such as SE are already known, e.g. from the European patent EP 0.231.967, and are therefore not described in detail here.

The operation of the ATM switching network is such that all the live packets supplied by the live traffic source at the location A, instead of being transmitted straight away to their destination, i.e. to the live traffic receiver at the location B, are deviated, directly or via the ATM switching network, to the first performance measurement device PMDA. When such a live (video) packet is received at the input terminal IN of PMDA, it is transmitted to the switching element SE via the input interface board IIB. SE then performs a first route selection in function of the routing information stored in the header of the received live packet and which indicates whether this packet is intended to the location B or not. As a consequence, SE transfers the packet either to its output O1 or to its output O2. In more detail, if the live packet belongs to the communication to be measured, i.e. the communication of video packets between A and B, and has thus to be translated into a test packet, SE transfers this live packet to the distribution based analyzer DBA via the output O1. On the contrary, if the live packet belongs to another communication, although also established by A, and must not be used for the test, SE transfers it to the output O2 and from there back to the ATM switching network via the output interface board and the output terminal OUT of PMD. This live packet is then further transmitted to its destination receiver and its transfer through the performance measurement device PMDA remains transparent for the users.

Since the distribution based analyzer DBA receives from the switching element SE selected live packets and, consequently, idle packets in between, the aim of DBA is to recognize idle packets from not-idle or live packets and to send, for each live packet received from SE, a request signal to the virtual channel generator VCG. Additionally, the distribution based analyzer DBA also provides the header of the received live packet to the virtual channel generator VCG. The latter then creates a test packet. The header of this test packet is similar to the header of the corresponding live packet, i.e. contains at least an indication of the address of the destination subscriber location B, but also contains a parameter which indicates that it is a test packet and no more a live (video) packet. Moreover, the data field or payload of the test packet is now loaded with performance measurement data which replaces the former live communication data.

The test packet created by VCG is then transmitted to the switching element SE via the input I2 thereof. SE transfers the test packet from its input I2 to its output O2 and so further to the ATM switching via the output interface board OIB and the output terminal OUT.

It is to be noted that the virtual channel generator VCG instead of generating a test packet for each live packet received from DBA as described above may also generate real time test packets either automatically, e.g. periodically with a predetermined time interval, or manually upon request of an operator. These possibilities are however not discussed in detail in the present description because the test packets which are then generated by VCG create a measurement traffic which is added to the real time traffic and that the purpose of the invention is to create a measurement traffic which operates in the place of live traffic, i.e. without adding any other traffic.

The test packet transmitted from the performance measurement device PMDA to the ATM switching network is routed in the latter to the subscriber location B according to the routing information stored in its header. However, instead of being transmitted directly to B, the ATM switching network has been so initialized that all the packets having the location B as destination are first deviated to the performance measurement device PMDB located near to B as indicated above.

The test packets, as well as any other packets having the subscriber location B as destination, are thus applied to the input terminal IN of PMDB and so further to the input I1 of SE via the input interface board IIB. The switching element SE then performs a selection amongst the test packets originated by the live traffic source at the subscriber location A and which are then transferred to the output O1, and the other packets having also the location B as destination and which are immediately transferred to the output O2. The latter packets are then really transmitted to the live traffic receiver at the subscriber location B via the output interface board OIB, the output terminal OUT of PMDB and the ATM switching network. On the contrary, the test packets are transferred to the distribution based analyzer DBA which, additionally to its above function of distinguishing live packets from idle packets, is also able to recognize test packets and to analyze the contents of their data field, i.e. the performance measurement data, for providing results of the requested performance measurement.

While the principles of the invention have been described above in connection with specific apparatus, it is to be clearly understood that this description is made only by way of example and not as a limitation on the scope of the invention.

We claim:

1. Performance measurement system for at least one communication path between a first and a second subscriber location of a telecommunication packet switching network, said system including a test packet generation means (PMDA-VCG) for generating test packets and for transmitting them through said switching network by applying them to a first end of said communication path associated with said first subscriber location, and a packet analyzer means (PMDB-DBA) for receiving said test packets at a second end of said communications path associated with said second subscriber location and for measuring the performance characteristics of said communication path, characterized in that said test packet generation means (PMDA-VCG) are adapted to receive live data communication packets from a live traffic source located at said first subscriber location and to convert said live packets to said test packets.

2. Performance measurement system according to claim 1, characterized in that it further includes another test packet generation means (PMDB-VCG), for applying other test packets to said second end of said communication path and another said packet analyzer means (PMDA-DBA) receiving said other test packets at said first end of said communication path, and that said test packet generation means together with said packet analyzer means at said first and second ends of said communication path are included in distinct performance measurement devices (PMDA, PMDB) having a like structure (PMD).

3. Performance measurement system as claimed in claim 2, characterized in that said live packets are received in said test packet generation means (PMDA-VCG) from said live traffic source via said switching network.

4. Performance measurement system as claimed in claim 2, characterized in that it further includes packet switching means (PMDA-SE) coupled between said live traffic source and said test packet generation means (PMDA-VCG), said packet switching means being adapted to receive packets and to transmit them either to said test packet generation means (PMDA-VCG) or to said switching network according to predetermined parameters stored in said packets.

5. Performance measurement system as claimed in claim 2, characterized in that said another packet analyzer means (PMDA-DBA) is coupled between said live traffic source and said test packet generation means (PMDA-VCG) and is adapted to receive packets, to recognize test packets from live packets and to transmit the latter to said test packet generation means (PMDA-VCG).

6. Performance measurement system according to claim 5, characterized in that said test packet generation means (PMDA-VCG) provides one test packet for each of said live packets received from said packet analyzer means (PMDA-DBA).

7. Performance measurement system according to claim 1, characterized in that each of said packets has a data field and a header which stores routing information indicative of the destination of said packet through said switching network.

8. Performance measurement system as claimed in claim 7, characterized in that the data field of said test packet provided by said test packet generation means (PMDA-VCG) stores performance measurement data.

9. Performance measurement system as claimed in claim 7, characterized in that the header of said test packet provided by said test packet generation means (PMDA-VCG) is at least partly identical to the header of the corresponding live packet received from said packet analyzer means (PMDB-DBA).

10. Performance measurement system as claimed in claim 7, characterized in that said predetermined parameters are stored in the header of said packet.

11. Performance measurement system according to claim 9, characterized in that said packet analyzer means (PMDA-DBA) is coupled between said packet switching means (PMDA-SE) and said test packet generation means (PMDA-VCG), and is adapted to measure said performance characteristics as a function of performance measurement data stored in the data field of said received test packets.

12. Performance measurement system according to claim 1, characterized in that said switching network is an asynchronous transfer mode (ATM) switching network.

13. Performance measurement system as claimed in claim 6, characterized in that the data field of said test packet provided by said test packet generation means (PMDA-VCG) stores performance measurement data.

14. Performance measurement system as claimed in claim 6, characterized in that the header of said test packet provided by said test packet generation means (PMDA-VCG) is at least partly identical to the header of the corresponding live packet received from said packet analyzer means (PMDA-DBA).

15. Performance measurement system according to claim 4, characterized in that said predetermined parameters are stored in the header of said packet.

16. Performance measurement system according to claim 4, characterized in that said packet analyzer means (PMDA-DBA) is coupled between said packet switching means (PMDA-SE) and said test packet generation means (PMDA-VCG), and is adapted to measure said performance characteristics as a function of performance measurement data stored in the data field of said received test packets.

* * * * *